United States Patent Office.

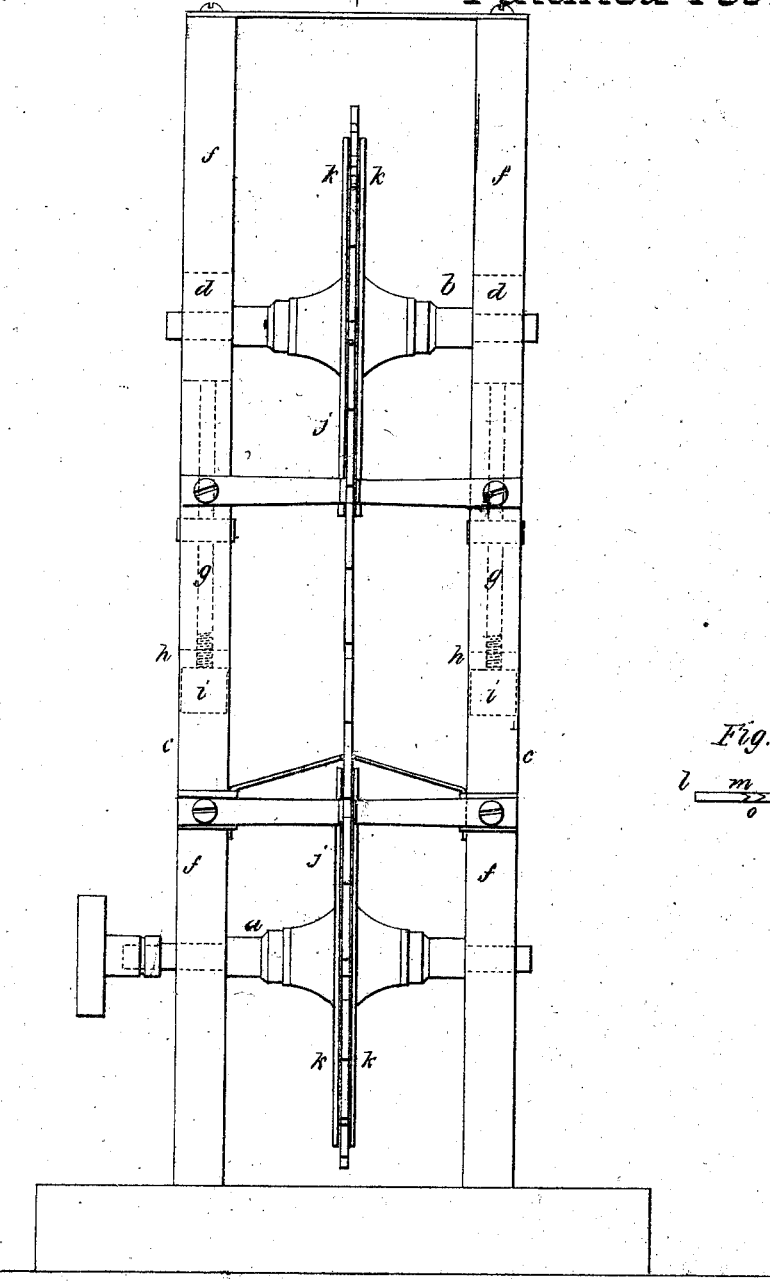
De Lancy Kennedy.
Chain-Saw.
N° 74097  Patented Feb. 4, 1868
Fig. 3. C, c.
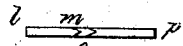
Witnesses
Inventor
De Lancy Kennedy

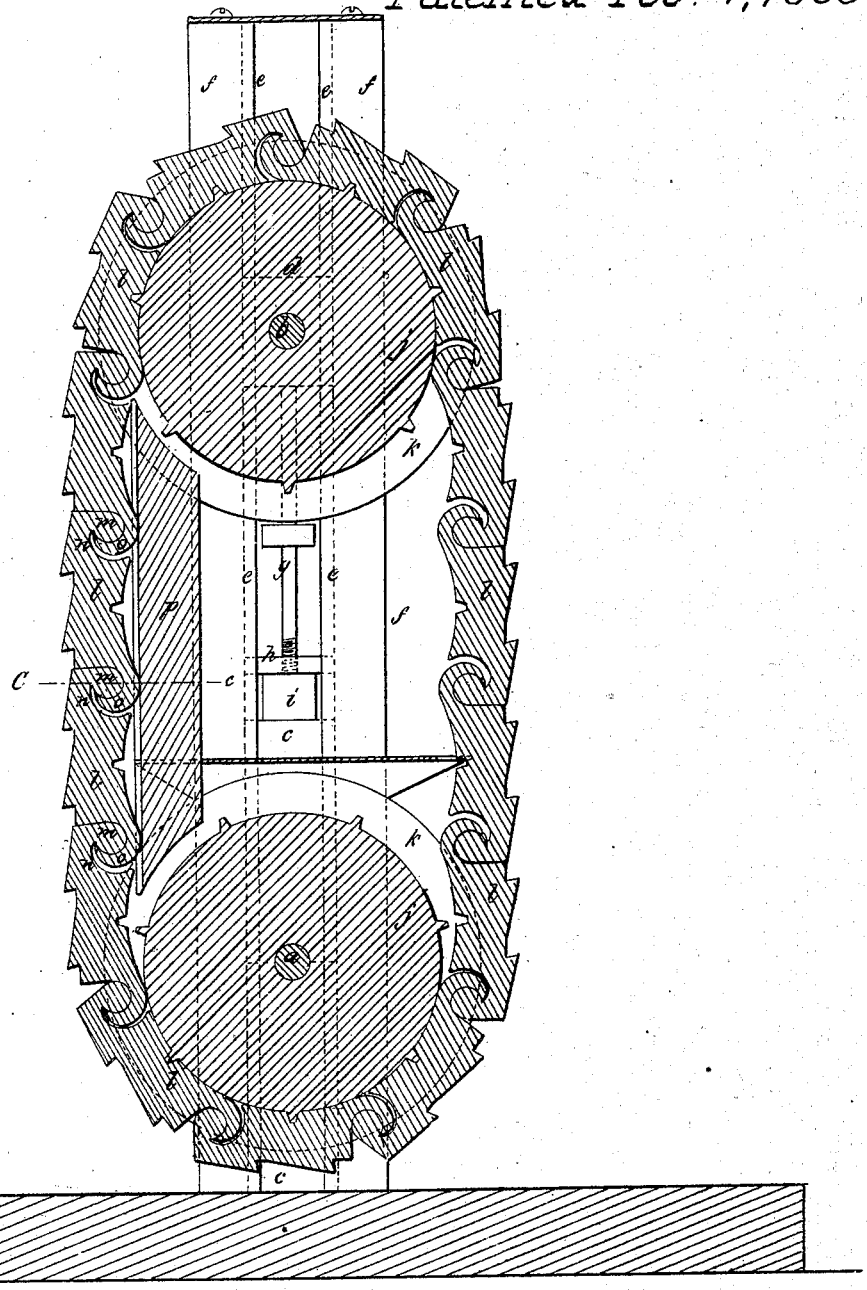

DE LANCY KENNEDY, OF NEW YORK, N. Y., ASSIGNOR TO HENRY J. KENNEDY, OF SAME PLACE.

Letters Patent No. 74,097, dated February 4, 1868.

---

IMPROVEMENT IN CHAIN-SAWS.

---

The Schedule referred to in these Letters Patent and making part of the same.

---

TO ALL WHOM IT MAY CONCERN:

Be it known that I, DE LANCY KENNEDY, of the city, county, and State of New York, have invented certain new and useful Improvements in Endless-Chain Saws for Saw-Mills; and I do hereby declare that the following is a full, clear, and exact description thereof, reference being had to the accompanying drawings making part of this specification, in which—

Figure 1 is a front elevation of the saw mounted.

Figure 2, a vertical section taken in the plane of the line A $a$ of fig. 1; and Figure 3, a horizontal section taken in the plane of the line C $c$ of fig. 2.

The same letters indicate like parts in all the figures.

It has long been desired to produce an endless saw, on account of the obvious advantages which, if made practical, it would possess over reciprocating and circular saws, but all attempts heretofore made, so far as I am informed, have failed on account of practical defects, which have been avoided by my invention. The saw, according to my invention, is composed of a series of sections or links, with one edge formed with the teeth and the other adapted to the peripheries of two wheels, around which they pass, and by which they are driven when connected to form a chain. These links or sections are formed all alike, and with a hook at one end, the cavity of which is in the form of a segment of a circle, to receive and embrace a projection of corresponding form on the adjacent end of the next section, the periphery of the said projection being V-grooved to receive the hook, which is of a reversed form. By this mode of connecting the links or sections, the chain can work freely around the wheels, by which it is driven and kept distended, the projection on one end of each link being free to turn in the hook at the other end of the next adjacent section, whilst at the same time all the sections are maintained in the same plane by the fitting of the double-bevelled inner edge of the hooks, fitting in the V-grooved peripheries of the projections.

There are other and minor features in my said invention, which will be pointed out hereafter.

In the accompanying drawings, $a$ and $b$ represent two horizontal parallel shafts, one of which, $a$, is mounted to turn in fixed boxes, $c\ c$, and provided with a pulley, or other suitable means by which motion can be imparted, and $b$ is mounted in movable boxes $d\ d$, adapted to slide in ways $e\ e$, formed in vertical standards $f\ f$, the said boxes being provided with screws $g\ g$, the upper ends of which bear against the under side of the movable boxes $d\ d$, and their lower and threaded ends fitted to nuts $h\ h$, which rest on springs $i\ i$, (India rubber being preferred,) by means of which combination the saw-chain can be properly distended by an elastic force, whilst at the same time the shafts can be readily adapted to any length of saw, so as to keep it in a proper state of tension, and it will afford a ready means of liberating the saw whenever it may be desired to separate the links or sections. On these shafts are mounted the two wheels $j\ j$, which carry the saw. I prefer to make them of equal size. Their peripheries are grooved to receive the saw, and the sides or flanches, $k\ k$, forming the said grooves, I prefer to have projecting from the peripheries of the wheels to a distance about equal to two-thirds of the width of the saw. The saw is composed of links or sections, $l$, as before indicated. The inner edge of each of the links is in the form of a segment of a circle equal to the diameter of the periphery of the wheels, that they may fit thereon, and they are notched to fit cogs on the periphery of one or both wheels. The outer edge of these links is formed with saw-teeth of any suitable shape. The upper end, at the back, is in the form of a segment of a circle, as at $m$, by rounding the upper inner corner, and cutting or otherwise forming a recess, $n$, and the lower end is formed with a hook, $o$, the inside of which is of a form to receive and turn on the segment $m$ on the adjacent end of the next link or section. The edge at one end of each link, when the chain is straight, abuts against the edge at the opposite end of the next adjacent link, so that the chain can bend outward, as in passing around the wheels, but not inward, when forced against the wood in cutting. The periphery of the segment $m$ is grooved, as represented in the sectional fig. 3, and the inner periphery of the hook $o$ is bevelled from both sides to fit the groove, so that when the sections are linked together, and the chain drawn tight around the wheels, the sections are prevented from moving on one another laterally, and are thus kept in the same plane.

There is a guide-plate, p, of about the thickness of the saw, placed behind the saw, where it is to act on the wood, to prevent the chain from being strained by the pressure of the wood. This guide-plate is secured by braces to the frame of the mill, and I prefer to extend the ends of it into the grooves of the wheels j j, to insure its being in the plane of the saw. The front edge of the guide is grooved, and the projecting parts of the back edge of the links of the chain are bevelled to run in the said groove, so that the saw, when in action, will be always kept in line.

By reason of the method of linking together the sections, as above described, the chain-saw can receive a continuous motion of considerable velocity, thus avoiding the loss of time and power unavoidable in the use of the reciprocating saw, and as it can be made of any desired length it can be applied to sawing logs of the largest diameter, a result which cannot be attained with the circular saw. And what is very important, as the sections can be readily disconnected and reconnected, they can be made of hardened steel, and sharpened by grinding, as a chisel, instead of being made soft enough to be sharpened with a file. And although a saw made according to my said invention can be run without a guide-plate behind it, I deem the employment of such a guide, in combination, a material improvement.

I am aware that guides have been used in combination with belt and other saws, but such guides have been made to embrace the thickness of the saw, and hence had to be placed above or below the track of the log to be sawed. I do not, therefore, wish to be understood as making claim broadly to the use of a guide, in combination with a chain-saw, but the object of that part of my invention is to give a support to the back of the saw, to prevent it from being forced back by the log, and thereby relieve the strain on the joints of the links, while at the same time the saw is prevented from moving laterally.

What I claim as my invention, and desire to secure by Letters Patent, is—

The manner, substantially as herein described, of connecting the several sections to constitute an endless-chain saw, as and for the purpose described.

And I also claim, in combination with the chain-saw, the guide-plate, made no thicker than the saw, and placed behind the back edge thereof, substantially as and for the purpose specified.

DE LANCY KENNEDY.

Witnesses:
WM. H. BISHOP,
A. DE LACY.